(12) United States Patent
Salter et al.

(10) Patent No.: US 12,380,401 B2
(45) Date of Patent: Aug. 5, 2025

(54) PACKAGE MANAGEMENT SYSTEM

(71) Applicant: Ford Global Technologies, LLC, Dearborn, MI (US)

(72) Inventors: Stuart C. Salter, White Lake, MI (US); Brendan Diamond, Grosse Pointe, MI (US); Pietro Buttolo, Dearborn Heights, MI (US); John Robert Van Wiemeersch, Novi, MI (US); Christina Galvez, Dearborn, MI (US); Arnav Wagh, Detroit, MI (US)

( * ) Notice: Subject to any disclaimer, the term of this patent is extended or adjusted under 35 U.S.C. 154(b) by 314 days.

(21) Appl. No.: 18/173,619

(22) Filed: Feb. 23, 2023

(65) Prior Publication Data

US 2024/0289740 A1    Aug. 29, 2024

(51) Int. Cl.
*G06Q 10/087* (2023.01)
*B60P 3/00* (2006.01)
*G06Q 10/0833* (2023.01)

(52) U.S. Cl.
CPC ............ *G06Q 10/087* (2013.01); *B60P 3/007* (2013.01); *G06Q 10/0833* (2013.01)

(58) Field of Classification Search
CPC .... G06Q 10/087; G06Q 10/0833; B60P 3/007
See application file for complete search history.

(56) References Cited

U.S. PATENT DOCUMENTS

| | | | | |
|---|---|---|---|---|
| 5,873,097 A | * | 2/1999 | Harris | G06F 16/2308 707/999.203 |
| 9,950,862 B2 | | 4/2018 | Kadaba et al. | |
| 10,988,069 B2 | | 4/2021 | Vincent | |
| 11,436,553 B2 | * | 9/2022 | Kirmani | G06Q 10/0833 |
| 11,975,753 B2 | * | 5/2024 | Courtens | B62B 3/02 |
| 2016/0300184 A1 | * | 10/2016 | Zamer | G06Q 10/0836 |

(Continued)

FOREIGN PATENT DOCUMENTS

WO    2018024852 A1    2/2018

OTHER PUBLICATIONS

Chuanwen Luo et al., Delivery Route Optimization with Automated Vehicle in Smart Urban Environment, Theoretical Computer Science, Elsevier B.V., Mar. 9, 2020, 1-11.

(Continued)

*Primary Examiner* — Gertrude Arthur Jeanglaude
(74) *Attorney, Agent, or Firm* — Emily Drake; Eversheds Sutherland (US) LLP (57) ABSTRACT

A delivery vehicle is described. The vehicle may include a holding mechanism configured to hold a plurality of containers within the delivery vehicle. The plurality of containers may be configured to store a plurality of packages. The vehicle may further include a memory configured to store a first information including package attributes of each package and a mapping of each package with a container of the plurality of containers. The vehicle may further include a processor configured to obtain the first information from the memory. The processor may be further configured to determine a target location to load a target package or a target container in the delivery vehicle based on the first information. The processor may further activate a vehicle interior visual or audio component to indicate the target location in the delivery vehicle to load the target package or the target container.

18 Claims, 5 Drawing Sheets

(56) References Cited

U.S. PATENT DOCUMENTS

2018/0197139 A1* 7/2018 Hill .................... G06Q 10/0832
2020/0207250 A1* 7/2020 Jarvis ................. G01C 21/3623
2020/0385207 A1   12/2020 Godwin et al.
2021/0272049 A1*  9/2021 Gillen ................. H04L 67/1001
2021/0370988 A1* 12/2021 Cheng .................... B60P 3/007

OTHER PUBLICATIONS

Manuel Ostermeier et al., Cost-Optimal Truck-And-Robot Routing for Last-Mile Delivery, Wiley, DOI 10.1002/net.22030, Jan. 20, 2021, 1-26.

* cited by examiner

PACKAGE MANAGEMENT SYSTEM

TECHNICAL FIELD

The present disclosure relates to a package management system, and more particularly, to a package management system that facilitates loading/unloading of packages in a delivery vehicle.

BACKGROUND

With the continued growth of internet-based commerce, package delivery is increasingly used to deliver goods to customers. Specifically in the US, e-commerce business is expected to continue to grow in the years to come.

Unprecedented growth is received favorably by e-commerce companies. However, the rapid growth also leads to operational challenges in the supply chain. E-commerce companies and their delivery partners deliver an ever-increasing number of packages per day, while reducing resource expenditure (e.g., delivery time, labor, etc.).

Various approaches currently used to optimize delivery volume and standard delivery time of packages include the use of smart routing and smart vehicle allocation. For example, some conventional delivery partners may aggregate delivery of packages with unrelated shipments having similar destination addresses (for example, addresses in the same neighborhood). Another conventional approach includes sorting and loading of packages into a delivery vehicle in a preset order, based on the delivery route, to increase delivery efficiency.

Although conventional approaches may create delivery efficiencies, they are unable to mitigate all the delivery related challenges faced by e-commerce companies and delivery partners. For example, loading and unloading of packages to/from the delivery vehicle is a manual process, and hence prone to human error.

Thus, there still exists a need in the industry for a package management system that facilitates minimizing human error while loading or unloading delivery packages.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a delivery vehicle for delivering a plurality of packages in a delivery route. Specifically, the delivery vehicle facilitates a user (or a robot) during package loading/unloading operation. The delivery vehicle may include a holding mechanism or a base plate that may hold a plurality of containers/bins within the delivery vehicle. Each bin may hold one or more packages. A user may place a package (or more than one package) in a bin and couple the bin to the base plate. Specifically, a vehicle processor may use package attributes and determine a target location within the base plate where the user may couple the bin. The package attributes may include, for example, package destination location, delivery schedule, weight, dimensions, content information and/or the like. In addition, the vehicle processor may assist/guide the user to reach to the target location. For example, responsive to determining the target location, the vehicle processor may activate a vehicle interior visual or audio component to guide the user to the target location to load the package and/or the bin. The vehicle interior visual or audio component may include, for example, a vehicle projector/spotlight, a vehicle speaker, a vehicle display, etc.

In a similar manner, the delivery vehicle may assist the user when the user unloads the packages. For example, the processor may activate the vehicle interior visual or audio component when the delivery vehicle reaches the package destination location and may assist the user to reach to the target location where the package to-be delivered may be placed in the delivery vehicle. In additional aspects, the vehicle processor may use vehicle interior cameras to determine whether the user has picked a correct package during package unloading operation, and may provide a confirmation notification/signal to the user when the user picks the correct package. Alternatively, the vehicle processor may provide an error notification/signal, when the user picks an incorrect package.

In some aspects, the base plate may be slidably coupled to delivery vehicle sidewalls, such that the base plate may slide in and out of a delivery vehicle cargo storage area. In this case, the base plate may slide out from the vehicle cargo storage area when the user loads (or unloads) the packages or the bins to the base plate.

The present disclosure discloses a delivery vehicle that provides assistance to the user during package loading/unloading operation. By providing visual and/or audio guidance, the delivery vehicle facilitates in minimizing human error during package loading and unloading. Further, the vehicle uses existing vehicle components to provide guidance to the user, and thus may not require external components. Furthermore, base plate sliding functionality makes it easier for the user to load/unload packages in the delivery vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
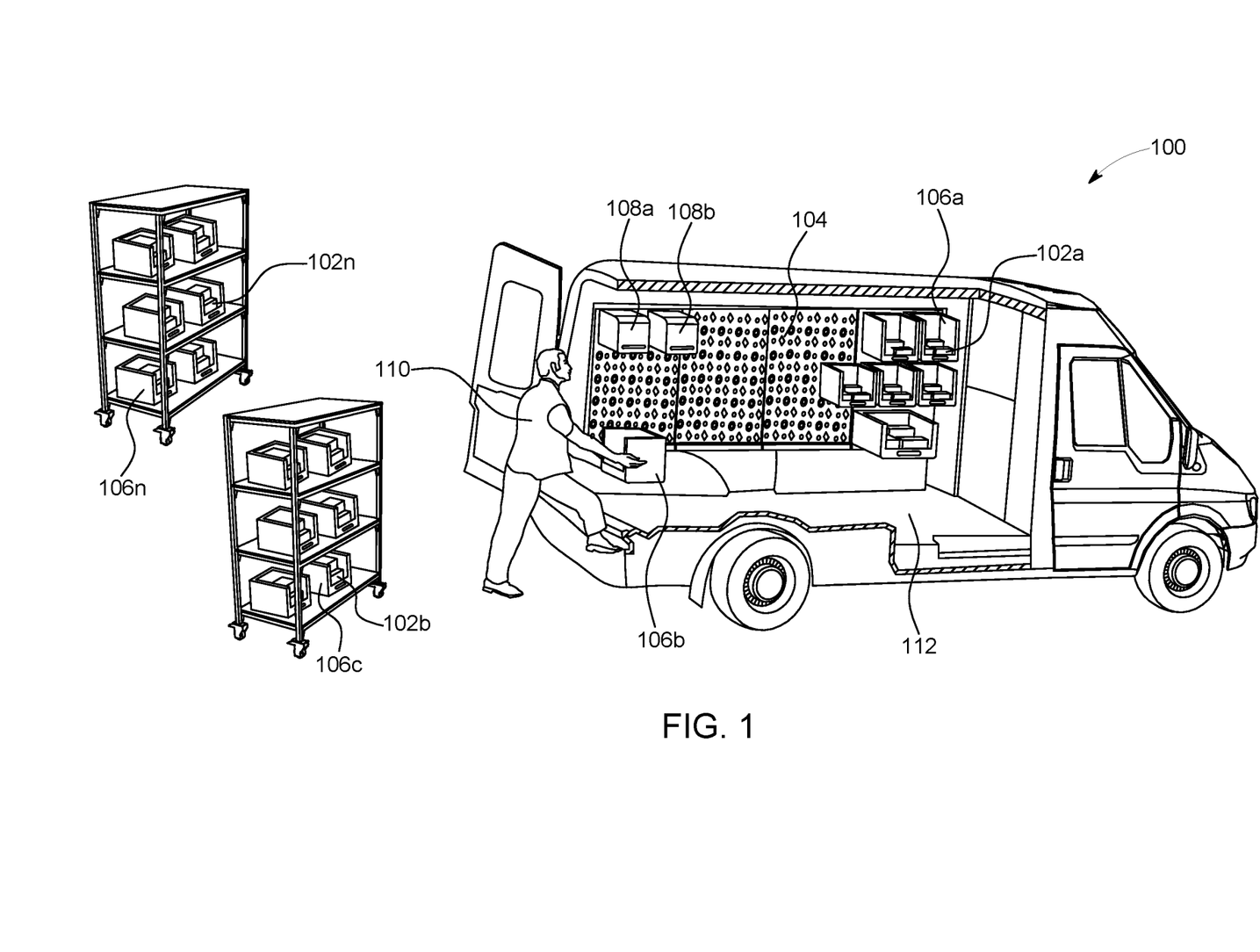
FIG. 1 depicts an example delivery vehicle in which techniques and structures for providing the systems and methods disclosed herein may be implemented.

FIG. 1 depicts an example delivery vehicle 100 in which techniques and structures for providing the systems and methods disclosed herein may be implemented. The delivery vehicle 100 may include, but is not limited to, a truck, a van (including walk-in vans), a truck trailer, and/or the like. In some aspects, the delivery vehicle 100 may be an autonomous vehicle. In other aspects, a driver/operator may operate the delivery vehicle 100. The delivery vehicle 100 may be configured to deliver a plurality of packages 102a, 102b, 102n (collectively referred to as a plurality of packages 102) to respective package destination locations. The plurality of packages 102 may be of different dimensions and weights.

The delivery vehicle 100 may include a holding mechanism 104 (or a base plate 104) that may be mounted on delivery vehicle sidewalls. Specifically, the base plate 104 may be mounted on delivery vehicle left sidewall and/or right sidewall. Base plate length and height may depend on sidewall length and height. Further, in some aspects, length and height of a base plate mounted on a left sidewall may be different from length and height of a base plate mounted on a right sidewall. In other aspects, the base plates on the left and right sidewalls may have equal or equivalent dimensions. The delivery vehicle 100 may also include more than one base plate (not shown in FIG. 1) on the vehicle left and/or right sidewalls.

The base plate 104 may be constructed of metal such as iron, steel, aluminum, or a combination thereof. Further, the base plate 104 may removably couple with or hold a plurality of containers or bins 106a, 106b, 106c, 106n (collectively referred to as a plurality of bins 106). The plurality of bins 106 may couple with the base plate 104 by using a physical coupling mechanism (not shown) that may include a peg and hook mechanism, a latching mechanism and the like, or a magnetic coupling mechanism. The plurality of bins 106 may be of different dimensions and weights.

Furthermore, the base plate 104 may be powered to regulate temperatures of one or more bins that may be coupled to the base plate 104. For example, a vehicle split charge battery (not shown) and/or a vehicle upfitter input output aggregator (IOA) may power the base plate 104, and may enable the base plate 104 to cool or heat one or more bins based on induction and by the use of a Peltier module. In an exemplary aspect, bins 108a, 108b (collectively referred to as bins 108) may be temperature-controlled bins. The bins 108 may include a Peltier module that may enable the bins to regulate temperature. The base plate 104 may pass electric current through the Peltier module to cool or heat the bins 108.

The plurality of bins 106 and the bins 108 may be configured to hold or store the plurality of packages 102. Specifically, one or more bin 106 may be configured to hold or store one or more packages 102, depending on bin dimensions and package dimensions, weight, etc. Further, the bins 108 may store packages that may require temperature regulated environment during storage (e.g., when the delivery vehicle 100 is in transit). Examples of such packages include, but are not limited to, medicines, perishable food items, fresh produce, frozen goods and/or the like. Each bin 106, 108 may have a shape of a cube, cuboid, or any other shape that makes full use of base plate area(s). In some aspects, the bins 108 may be enclosed or fully closed so that the bins 108 may keep the packages cold or hot. In further aspects, the bins 106 may be fully closed or partially closed. For example, the bins 106 may have an open top portion.

Each package 102 may be of any shape and may enclose different types of delivery content. The delivery content may include, but is not limited to, books, electronic items, home décor items, fragile items, items that require temperature regulated environment (e.g., medicines, perishable food items, as mentioned above) and/or the like. In some aspects, each package 102 may include an identifier, for example, a Quick Response code (QR code), that may be linked to information associated with package attributes. For example, a package 102b QR code may be linked to package 102b attributes such as a package 102b destination location, a package 102b delivery schedule, a package 102b weight, package 102b dimensions, a desired package 102b temperature and package 102b content information. In some aspects, the package 102b QR code may be disposed on a package 102b body, which may enable a QR code reader (e.g., a vehicle QR code reader or any other QR code reader, not shown) to easily read the QR code and enable access to the package 102b attributes.

The delivery vehicle 100 may facilitate a user 110 (or a robot, not shown) to efficiently load/upload the packages 102 in the delivery vehicle 100. Specifically, the delivery vehicle 100 may facilitate the user 110 to load the packages 102 in the delivery vehicle 100 in a preset order. In some aspects, the preset order may be based on the package attributes. For example, a package that may require cool temperature may be placed in the bins 108. Further, a package with an early delivery schedule or whose delivery destination location is first in a delivery vehicle travel route may be placed in a bin that may be coupled near to a vehicle exit point/gate. The vehicle exit point/gate may be, for example, the point from where the user 110 can easily pick the package 102, with minimal manual effort. Furthermore, heavier packages may be placed at a predefined distance from each other to optimize weight distribution within the delivery vehicle 100 and maximize vehicle stability (e.g., by preventing a vehicle axle from being overloaded).

In operation, the user 110 may scan the QR codes disposed on the packages 102 when the user 110 loads the packages 102 in the delivery vehicle 100. For example, the user 110 may scan the package 102b QR code by using the vehicle QR code reader. Responsive to reading the package 102b QR code, the QR code reader may send a package 102b identifier associated with the package 102b QR code to a package management system processor (not shown). The system processor may use the package 102b identifier and access the package 102b attributes (that may be pre-stored in a system memory). The system processor may determine a target location in the delivery vehicle 100 where the user 110 may place the package 102a, based on the package 102a attributes. The system processor may further instruct the user 110 to place the package at the target location (specifically in a bin coupled to the base plate 104 at the target location).

For example, the system processor may instruct the user 110 to place the package 120b in the bin 108a when the package 102b includes medicines or frozen food items. Alternatively, the system processor may instruct the user 110 to place the package 120b in a bin that may be closer to a temperature-controlled area in the delivery vehicle 100, e.g., near a heater or an air-conditioning vent, when the package 102b includes medicines or frozen food items. Similarly, the processor may instruct the user 110 to place the package 120b in the bin 106a when the package 102b delivery destination location is late in the delivery vehicle travel route or when the package contains fragile content.

In some aspects, the bins 106, 108 may be pre-coupled to the base plate 104 and the system processor may instruct the user 110 to place the package 102b in one of the bins 106, 108, as described above. In this case, the user 110 may enter a vehicle cargo bed area 112 and place the package 102b in the bin 106/108 that may be pre-coupled to the base plate 104 in the target location determined by the system processor.

In other aspects, the bins 106, 108 may not be pre-coupled to the base plate 104. In this embodiment, the system processor may instruct the user 110 to first place the package 102b in a particular or specific bin (e.g., the bin 106c or the bin 106n), and then couple the bin 106c/106n to the base plate 104 in the target location determined by the system processor. For example, the system processor may instruct the user 110 to place the package 102b in the bin 106c (which, as an example, may store all packages with fragile content), and then couple the bin 106c to the target location (which may be far from the vehicle exit point) in the delivery vehicle 100. In this case, the user 110 may enter the vehicle cargo bed area 112 and couple the bin 106c to the base plate 104 by using the physical coupling mechanism or the magnetic coupling mechanism, described above.

In a similar manner, the delivery vehicle 100 may assist the user 110 during package unloading operation. For example, the delivery vehicle 100 may instruct the user 110 to pick the package 102b from the target location (specifically from the bin, e.g., the bin 106c, that may be coupled to the base plate 104 at the target location), when the delivery vehicle 100 reaches the package 102b delivery destination location.

In accordance with the present disclosure, the delivery vehicle 100 may instruct the user 110 or may assist the user 110 to reach to the target location (for performing package loading or unloading operation) in the delivery vehicle 100 by using a vehicle interior audio or visual component. For example, the delivery vehicle 100 may activate an interior vehicle projector, a Light Emitting Diode (LED) coupled to the base plate 104 or the bins 106/108, a vehicle speaker, a vehicle display system, etc. to assist the user 110 to reach to the target location. The details of assisting the user 110 to reach to the target location are described in conjunction with FIG. 3.

Figure 2:
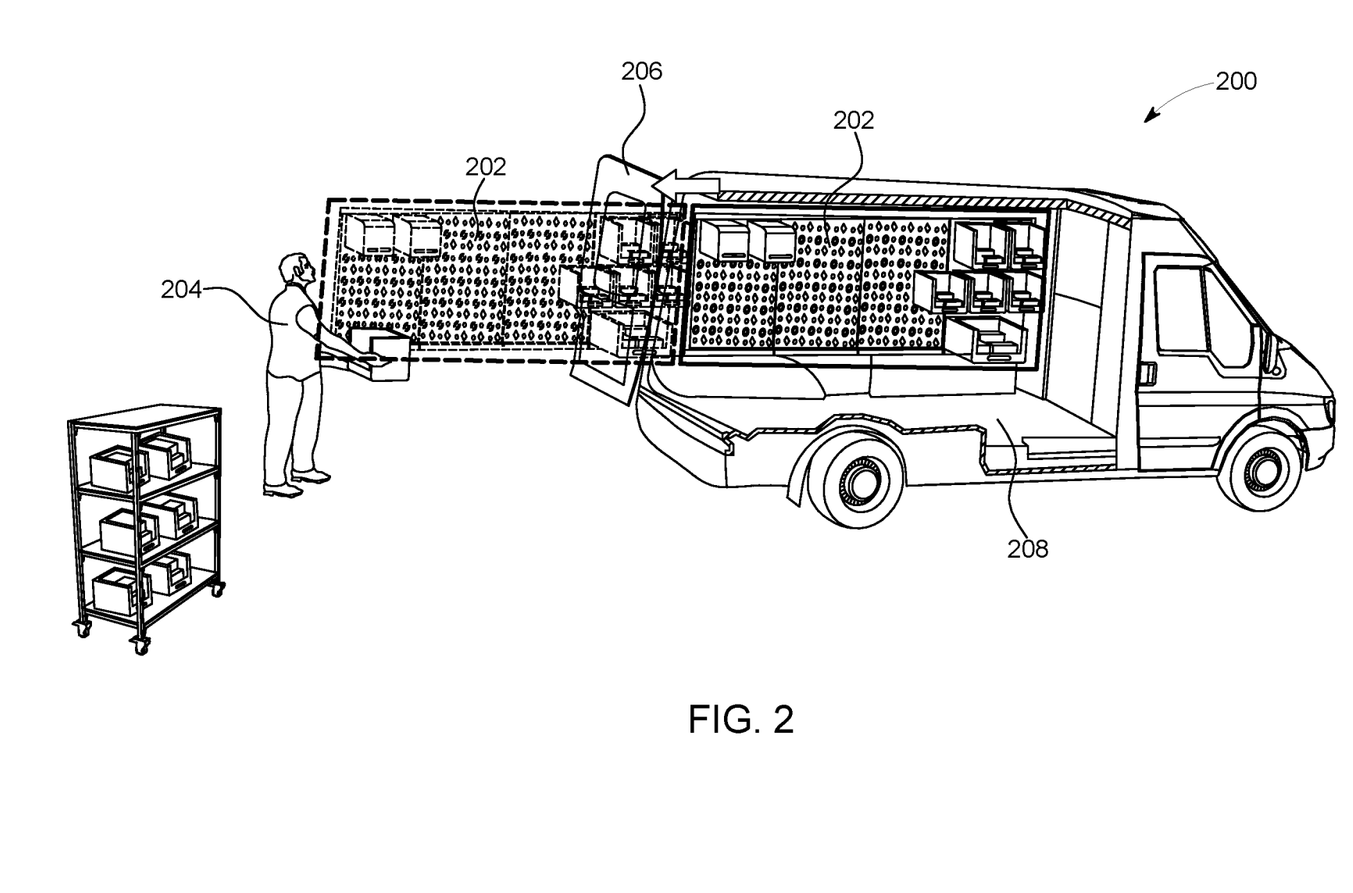
FIG. 2 illustrates another example delivery vehicle in accordance with the present disclosure.

FIG. 2 illustrates another example delivery vehicle 200 in accordance with the present disclosure. The delivery vehicle 200 may be similar to the delivery vehicle 100, however in the delivery vehicle 200, a base plate 202 (which may be same as the base plate 104) may be slidable. In this case, the base plate 202 may be mounted on the delivery vehicle sidewalls via a plurality of rollers (not shown) that may enable the base plate 202 to slide horizontally in and out of the delivery vehicle 200.

In some aspects, a user 204 may manually slide the base plate 202 outwards by unlocking a lock (e.g., a latch, not shown) and pulling the base plate 202 out from the delivery vehicle 200. In other aspects, base plate movement may be activated automatically, e.g., by the use of an actuator (that may include a servomotor). In this case, the user 204 may activate the actuator by using a vehicle Human Machine Interface (HMI) or a user device, that may cause a vehicle processor to actuate the actuator to move the base plate 202 out from the delivery vehicle 200. In yet another aspect, the base plate 202 may automatically slide out of the delivery vehicle 200 when a vehicle rear door 206 opens. In this case, the vehicle processor (not shown) may automatically activate the actuator when the vehicle rear door 206 opens, which may enable the base plate 202 to slide out.

In operation, the user 204 may load (or unload) the packages 102 to (or from) the bins 106, 108 and couple the bins 106, 108 to the base plate 202 when the base plate 202 slides out from the delivery vehicle 200. In the scenario where the bins 106, 108 may be pre-coupled to the base plate 202, the user may load the packages to the bins 106, 108 directly when the base plate 202 slides out from the delivery vehicle 200.

A person ordinarily skilled in the art may appreciate that in the delivery vehicle 200, the user 204 may not be required to enter a delivery vehicle cargo bed 208 to load/unload the packages 102 or the bins 106. This may assist in minimizing manual effort during package loading/unloading operation.

Similar to the delivery vehicle 100, the delivery vehicle 200 may instruct the user 204 or may assist the user 204 to load packages/bins in the target location by using the vehicle interior audio or visual component, as described in detail below in conjunction with FIG. 3.

Figure 3:
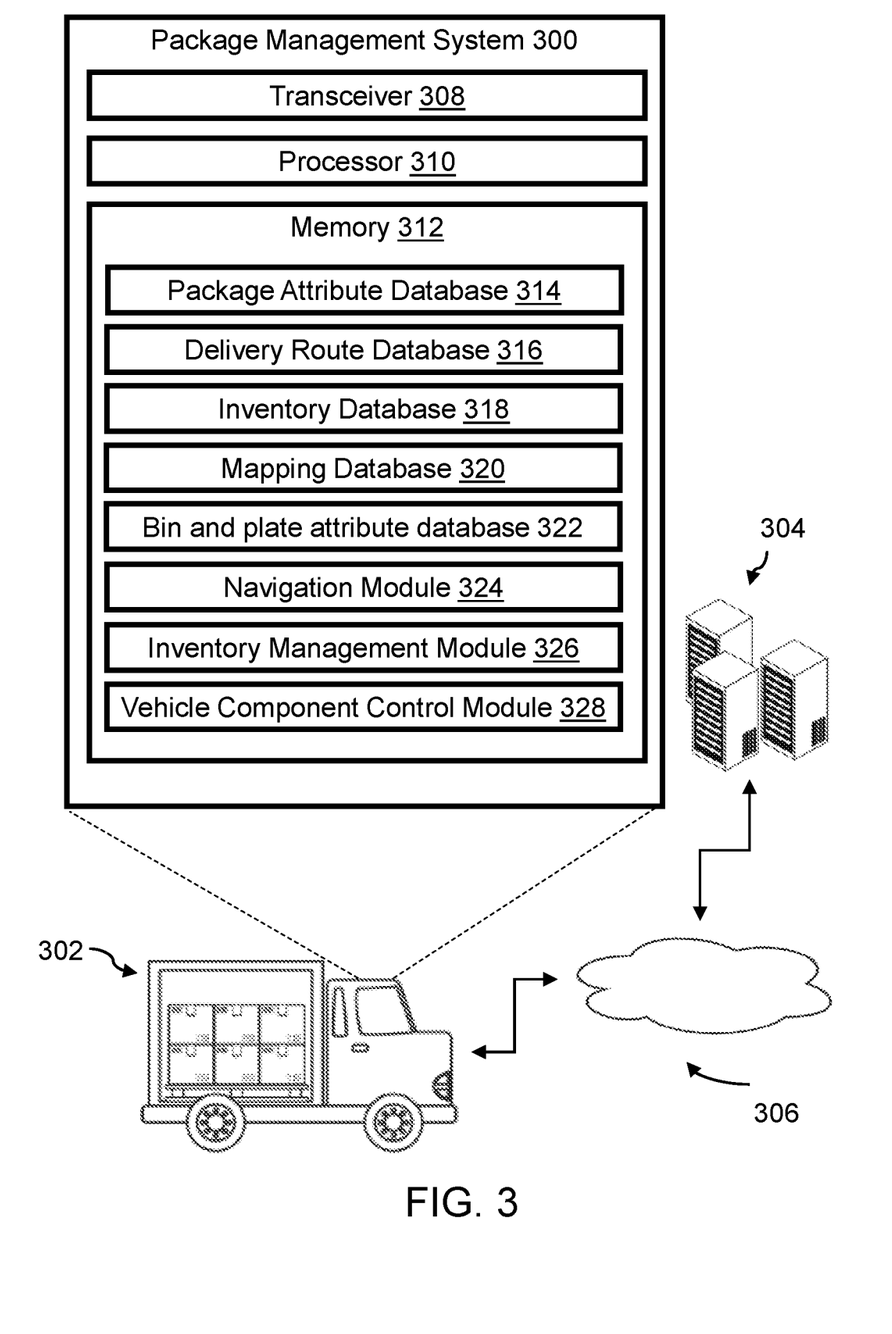
FIG. 3 illustrates a block diagram of an example package management system in accordance with the present disclosure.

FIG. 3 illustrates a block diagram of an example package management system 300 in accordance with the present disclosure. While describing FIG. 3, references may be made to FIG. 4. The system 300, as described herein, can be implemented in hardware, software (e.g., firmware), or a combination thereof. The system 300 may be part of an on-board computer (not shown) of a delivery vehicle 302 and may communicatively couple with one or more servers 304 (or a server 304), via one or more networks 306 (or a network 306). The delivery vehicle 302 may be same as the delivery vehicle 100 or the delivery vehicle 200.

The network 306 may be, for example, a communication infrastructure in which the connected devices discussed in various embodiments of this disclosure may communicate. The network 306 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The server 304 may be part of a cloud-based computing infrastructure and may be associated with and/or include a Telematics Service Delivery Network (SDN) that provides digital data services to the delivery vehicle 302 and other vehicles (not shown in FIG. 3), that may be part of a vehicle fleet. In additional aspects, the server 304 may be associated with a package delivery partner or an E-commerce operator that may facilitate the delivery vehicle 302 to deliver the packages 102 to respective package customers/destination locations.

As described above, the delivery vehicle 302 may assist the user 110 to load/unload packages in the delivery vehicle 302. Specifically, the delivery vehicle 302 may use the system 300 to assist the user 110 in package loading/unloading operation. The system 300 may include a plurality of components including, but not limited to, a transceiver 308, a processor 310 and a memory 312, which may communicatively couple with each other.

The memory 312 may store programs in code and/or store data for performing various system 300 operations in accordance with the present disclosure. Specifically, the processor 310 may be configured and/or programmed to execute computer-executable instructions stored in the memory 312 for performing various system 300 functions in accordance with the disclosure. Consequently, the memory 312 may be used for storing code and/or data code and/or data for performing operations in accordance with the present disclosure.

In one or more embodiments, the processor 310 may be disposed in communication with one or more memory devices (e.g., the memory 312 and/or one or more external databases (not shown in FIG. 3)). The memory 312 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 312 may be one example of a non-transitory computer-readable medium and may be used to store programs in code and/or to store data for performing various operations in accordance with the disclosure. The instructions in the memory 312 can include one or more separate programs, each of which can include an ordered listing of computer-executable instructions for implementing logical functions.

In some aspects, the memory 312 may store a plurality of information/dataset in one or more databases. Examples of such databases include, but are not limited to, a package attribute database 314, a delivery route database 316, an inventory database 318, a mapping database 320 and a bin and plate attribute database 322. In addition, the memory 312 may include one or more modules to facilitate system 300 operations. Examples of such modules include, but are not limited to, a navigation module 324, an inventory management module 326 and a vehicle component control module 328. The memory modules, as described herein, may be stored in the form of computer-executable instructions, and the processor 310 may be configured and/or programmed to execute the stored computer-executable instructions for performing system 300 functions in accordance with the present disclosure The memory 312 may store the package attributes of each package 102 that the delivery vehicle 302 may deliver in a delivery route, and may enable the processor 310 to assist the user 110 in package loading/unloading operation. Specifically, the transceiver 308 may be configured to receive the package attributes of each package 102 from an external database/server (e.g., the server 304) and send the package attributes to the memory 312 for storage purpose. The server 304 may be associated with a delivery partner, an E-commerce operator and/or the like, that may pre-store details (e.g., attributes) of each package 102. For example, the server 304 may pre-store package attributes for each package 102, such as package identifiers (e.g., package QR code details), package customer details (including the package destination location), the package delivery schedule, the package weight, the package dimensions, the desired package temperature, package content information and/or the like. In an exemplary aspect, the server 304 may send the package attributes for each package 102 to the transceiver 308 a predetermined time before the delivery vehicle 302 starts the delivery route.

Responsive to receiving the package attributes for the plurality of packages 102, the transceiver 308 may send the package attributes to the memory 312. The memory 312 may store the package attributes in the package attribute database 314.

The transceiver 308 may further receive delivery route details or navigation instructions from the server 304. The navigation instructions may assist a delivery vehicle operator (or an autonomous vehicle) to travel on the delivery route. In some aspects, the delivery route may be based on package delivery schedule and a date and time for delivery of each package 102. For example, the delivery route may be based on a sequence of delivery of each package 102 that the delivery vehicle 302 may deliver in the delivery route. In an exemplary aspect, the delivery route may be a shortest route to deliver the packages 102 or a route with minimum travel time.

The transceiver 308 may send the received delivery route details/navigation instructions to the delivery route database 316 for storage purpose. During transit, the processor 310 may fetch the delivery route details from the delivery route database 316 and assist the delivery vehicle operator (or the autonomous vehicle) to navigate on the delivery route. For example, the processor 310 may generate turn-by-turn navigation notification for the sequence of delivery locations in the delivery route. In some aspects, a vehicle display screen or HMI (not shown) may display the turn-by-turn navigation notification, and the processor 310 may augment the notification with audio alerts.

Although the description above describes an aspect where the server 304 sends the delivery route details/navigation instructions to the transceiver 308, in alternative aspects, the processor 310 may itself determine the delivery route details/navigation instructions based on the package attributes for the plurality of packages 102 stored in the package attribute database 314. In this case, the processor 310 may fetch the package attributes for each package 102 from the package attribute database 314 and use the instructions stored in the navigation module 324 to determine the delivery route for the delivery vehicle 302 that offers minimum travel time or the shortest route to deliver the packages 102.

In further aspects, the memory 312 may pre-store (or receive from the server 304) a plurality of bin and base plate attributes in the bin and plate attribute database 322. For example, the memory 312 may store bin attributes for each bin 106, 108 in the bin and plate attribute database 322. The bin attributes may include information associated with bin dimensions, bin weight, temperature regulation capability of each bin 106, 108. Similarly, the memory 312 may store base plate attributes of the base plate 104. The base plate attributes may include information associated with base plate dimensions, a number and locations of physical or magnetic coupling mechanisms attached to the base plate 104 (that may assist in coupling of bins 106, 108 to the base plate 104), locations of heating and/or air conditioning vents in (or in vicinity of) the base plate 104, locations where temperature regulated bins 108 may be coupled to the base plate 104 and/or the like.

The processor 310 may access the memory 312 to fetch the package attributes for each package 102 and the bin and base plate attributes. The processor 310 may further use the instructions stored in the inventory management module 326 to determine a mapping of each package 102 with each bin 106, 108, ("package-to-bin" mapping) based on package and bin attributes. Further, the processor 310 may determine a mapping of each bin 106, 108 with different locations in the base plate 104 ("bin-to-base plate location" mapping) based on package, bin and base plate attributes.

Specifically, the processor 310 may fetch the package attributes from the package attribute database 314 and bin attributes from the bin and plate attribute database 322 to determine the package-to-bin mapping of each package 102. For example, the processor 310 may determine that the package 102b may be mapped to the bin 106c, based on package 102b and bin 106c dimensions. Further, the processor 310 may fetch the base plate attributes from the bin and plate attribute database 322 and determine that the bin 106c may be mapped to a base plate location near to the vehicle exit/gate point, when the package 102b destination location is first in the delivery route. As further example, the processor 310 may map another package (e.g., the package 102n) to the bin 106c if the package 102n destination location is in proximity to the package 102b destination location.

Similarly, the processor 310 may determine that the package 102b may be mapped to the bin 108a (i.e., a temperature regular bin), when the package 102b attributes indicate that the package 102b contains content that may need cool storage temperature. The processor 310 may further map other similar packages to the bin 108a, when the packages require cool temperature. In addition, the processor 310 may map the bin 108a to a location on the base plate 104 that includes means to power a Peltier module associated with the bin 108a.

A person ordinarily skilled in the art may appreciate from the description above that the processor 310 may optimize package storage of each package 102 in the plurality of bins 106 by mapping packages with similar attributes to the same bin (assuming the bin can house more than one package, based on package and bin dimensions).

In a similar manner as described above, the processor 310 may map all the packages 102 to the bins 106, 108, and may in turn map the bins 106, 108 to different locations in the base plate 104, based on package, bin and base plate attributes.

Responsive to determining the mapping of each package 102 with each bin 106, 108, (i.e., the package-to-bin mapping) and the mapping of each bin 106, 108 with different base plate locations (i.e., the bin-to-base plate location mapping), the processor 310 may store respective mapping in the mapping database 320.

Although the description above describes that the processor 310 determines the package-to-bin mapping and the bin-to-base plate location mapping, in some aspects, the server 304 may determine the mappings described above. In other words, the server 304 may determine the mappings based on package, bin and base plate attributes. In this case, the server 304 may have access to or pre-store bin 106, 108 and base plate 104 attributes, and may use them to determine the mappings. In this case, the processor 310 may not be required to determine the mappings, and the server 304 may send the mappings to the mapping database 320 (via the transceiver 308) for storage purpose.

In operation, the user 110 may scan the QR code disposed on each package 102 (as described above in conjunction with FIG. 1) by using the vehicle or a separate QR code reader. The QR code reader may read the QR code (e.g., the package 102b QR code) and send the corresponding package 102b identifier to the transceiver 308. The transceiver 308 may send the package 102b identifier to the processor 310.

Responsive to receiving the package 102b identifier, the processor 310 may access the mapping database 320 to determine the bin (e.g., the bin 106c) that may be mapped to the package 102b. Further, the processor 310 may determine that the mapped bin (e.g., the bin 106c) may be mapped to the base plate location, e.g., "a target location", which may be near to the vehicle exit point. Alternatively, the processor 310 may determine that the bin 106c is mapped to the target location in the base plate 104 that is near to the vehicle air conditioning vent.

In a scenario where the bins 106, 108 may not be pre-coupled to the base plate 104, the processor 310 may instruct the user 110 (e.g., via audio commands by using a vehicle speaker) to place the package 102b in the bin 106c, and then move towards the target location to couple the bin 106c to the base plate 104 (e.g., by using the physical or magnetic coupling mechanism). In a scenario where the bins 106, 108 may be pre-coupled to the base plate 104, the processor 310 may instruct the user 110 to directly move towards the target location to place the package 102b in the bin 106c.

Figure 4:
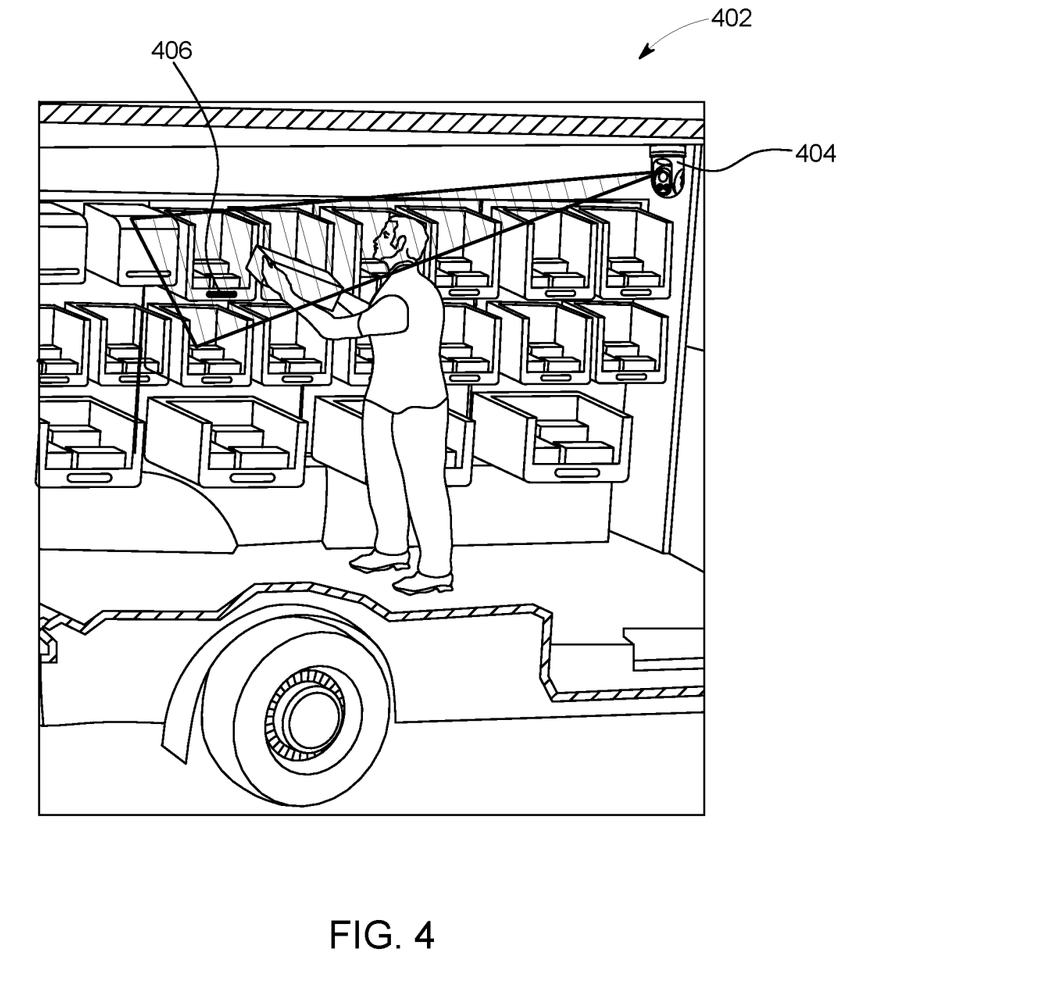
FIG. 4 depicts an example embodiment to load or unload a delivery package in accordance with the present disclosure.

In some aspects, the processor 310 may use instructions stored in the vehicle component control module 328 to assist the user 110 to reach to the target location. For example, the processor 310 may activate one or more of a vehicle projector/spotlight, a vehicle audio component (e.g., the vehicle speaker), a vehicle lighting component, a vehicle display component, a base plate/bin lighting component, etc., to assist the user 110 to reach to the target location. Examples of user assistance are shown in FIG. 4. Specifically, FIG. 4 depicts an example embodiments to load/unload the package 102b in accordance with the present disclosure.

In a scenario 402 shown in FIG. 4, the bins 106, 108 may be pre-coupled to the base plate 104, and the processor 310 may illuminate and direct a vehicle interior projector/spotlight 404 towards the target location. The vehicle interior projector/spotlight 404 may include a laser projector that may be connected to a vehicle cargo area top portion. The processor 310 may illuminate and cause the projector/spotlight 404 to point towards the target location to provide visual assistance to the user 110. The visual assistance may help the user 110 to easily reach to the target location.

In addition or alternatively, the processor 310 may illuminate a bin LED 406 to provide further visual assistance to the user 110. The bin LED 406 may be attached to a bin front portion. In some aspects, the processor 310 may illuminate the bin LED 406 by providing electric power to the bin LED 406 via the base plate 104. In other aspects, the processor 310 may illuminate the bin LED 406 by using vehicle-to-bin communication via a Bluetooth® based lighting system.

In another aspect (not shown), the processor 310 may illuminate LEDs or other lighting components that may be attached to the base plate 104 in vicinity to the bin 106c, to assist the user 110 to reach to the target location.

The processor 310 may further augment the visual assistance with additional assistance. For example, the processor 310 may provide audio instructions, via the vehicle speaker, to assist the user 110 to reach to the target location. Further, the processor 310 may provide audio instructions to the user 110 via bin audio systems. For example, each bin may include a chirper on a bin Printed Circuit Board (PCB), and the processor 310 may activate the chirper of the bin 106c PCB to assist the user 110 to reach to the target location. In additional aspects, each bin may include a sliding front door (connected to a bin body via a roller assembly and an electric motor) that may be opened to provide access to the bin. In this case, the processor 310 may activate the electric motor of the bin 106c to cause the bin 106c front door to automatically open. The user 110 may reach to the target location by visually checking the bin 106c whose front door is open.

In addition, the processor 310 may activate the vehicle display (e.g., a display that may be mounted in a vicinity to the base plate 104, or the vehicle HMI) and show the target location as a visual map on the display. The user 110 may follow the map displayed on the display to reach to the target location. In additional aspects, the processor 310 may display words or letters associated with the target location on the display to assist the user 110 to reach to the target location. For example, the processor 310 may display an identifier or a bin 106c location on the display, so that the user 110 may reach to the target location. In other aspects, the processor 310 may display the words or letters associated with the target location on vehicle cargo bed floor or cargo area top portion.

In further aspects, the processor 310 may display additional information associated with the package 102b on the display, the vehicle cargo bed floor or the cargo area top portion, that may assist the user 110. The additional information may include, for example, special package handing instructions from the package 102b customer, package 102b dimensions, and the like. For example, the additional information may include customer instructions such as "Handle the content with care" or "Get receipt signature/confirmation while delivering package", etc.

The processor 310 may also light up a path to the target location via vehicle cargo bed floor or cargo area top portion based lighting components, to assist the user 110. The user 110 may follow the illuminated path to reach to the target location.

The additional assistance may further include instructions on storage orientation of the package 102b in the bin 106c. For example, the processor 310 may instruct, via the vehicle speaker, the user 110 to place the package 102b in a vertical orientation in the bin 106c. The processor 310 may determine the package orientation in the bin 106c based on package attributes and a number of packages mapped to the bin 106c. For example, if the package 102b contains fragile content that might break if external weight is placed over the package 102b, and the bin 106c is mapped to more than one package, the processor 310 may instruct the user 110 to place the package 102b vertically in the bin 106c (to minimize probability of an additional package being placed over the package 102b).

In some aspects, the processor 310 may further provide a confirmation signal or notification to the user 110, when the user 110 places the package 102b in a correct bin (e.g., the bin 106c) and in the correct orientation. In this case, the processor 310 may use vehicle interior cameras (not shown) to identify dimensions of the package placed by the user 110 and/or scan the package QR code from afar, to determine whether the user 110 has placed the correct package 102b in the bin 106c.

In an exemplary aspect, the processor 310 may provide the confirmation signal to the user 110 via a color-coded lighting mechanism. For example, the processor 310 may illuminate the projector/spotlight 404 (or any other vehicle lighting component) in green color when the user 110 correctly places the package 102b in the bin 106c. The processor 310 may illuminate the projector/spotlight 404 in red color when the user 110 places the package 102b in an incorrect bin, or in orange color when the processor 310 is waiting for the user 110 to place the package 102b in the bin 106c. In other aspects, the processor 310 may provide the confirmation signal to the user 110 via audio means (e.g., the vehicle speaker).

Responsive to determining that the user 110 has correctly placed the package 102b in the bin 106c (or when the user 110 scans the package 102b QR code), the processor 310 may update the inventory database 318 to indicate that the package 102b in placed in the delivery vehicle 302. In some aspects, the inventory database 318 may store information associated with the packages that are present in the delivery vehicle 302. For example, as and when the user loads a package in the delivery vehicle 302, the processor 310 adds the identifier of the loaded package to the inventory database 318.

In some aspects, the delivery vehicle 302 may commence the delivery route when the user 110 places the plurality of packages 102 in the delivery vehicle 302. As described above, the processor 310 may generate turn-by-turn navigation notification based on the delivery route details stored in the delivery route database 316, and assist the delivery vehicle driver/autonomous driving system during transit.

The processor 310 may determine the package(s) to be delivered in a particular destination location, when the vehicle 302 reaches the destination location. Specifically, the processor 310 may use the navigation module 324 to determine whether the vehicle 302 has reached the destination location. Responsive to determining that the vehicle 302 has reached the destination location (e.g., the package 102b destination location), the processor 310 may access destination locations associated with each package 102 stored in the package attribute database 314 and determine the package (e.g., the package 102b) to be delivered at the destination location. A person ordinarily skilled in the art may appreciate that in a single destination location, the delivery vehicle 302 may deliver one or more packages. In other words, one or more packages may have same destination location.

Responsive to determining that the delivery vehicle 302 needs to deliver the package 102b, the processor 310 may further fetch the package-to-bin mapping and the bin-to-base plate location mapping from the mapping database 320 to determine the bin (e.g., the bin 106c) and the target location in the base plate 104 where the package 102b is placed.

Responsive to determining the target location, the processor 310 may provide visual and/or audio assistance to the user 110, as described above, to assist the user 110 to reach to the target location and unload the package 102b. For example, the processor 310 may perform one or more of: illuminate and direct the projector/spotlight 404 towards the target location, light up the bin 106c front portion using bin LED 406, open the bin 106c front door, provide audio commands via the vehicle speaker or the chirper on the bin 106c PCB, light up the path to the target location via the vehicle cargo bed floor or cargo area top portion based lighting components, display additional information associated with the package 102b on the display, the vehicle cargo bed floor or the cargo area top portion, and/or the like.

Further, the processor 310 may provide confirmation to the user 110, indicating whether the user 110 has picked the correct package 102b. In this case, the processor 310 may use the vehicle interior cameras to identify dimensions of the package picked by the user 110 and/or scan the package QR code from afar, to determine whether the user 110 has picked the correct package 102b from the bin 106c. Furthermore, the processor 310 may provide the confirmation to the user 110 via the color-coded lighting mechanism described above. For example, a green light from the projector/spotlight 404 may indicate that the user 110 has picked the correct package 102b, a red light may indicate that the user 110 has picked an incorrect package, and an orange light may indicate that the processor 310 is waiting for the user 110 to pick up the package 102b from the bin 106c.

Responsive to determining that the user 110 has picked the correct package 102b from the bin 106c, the processor 310 may perform additional checks to ensure that the user 110 is delivering a correct package to a correct delivery address/destination location. For example, the processor may capture a package 102b image (at the target location or when the user 110 is leaving the delivery vehicle 302), via the vehicle interior camera, and determine a delivery address/destination location that may be included or printed on a package 102b label disposed on the package 102b body. In this case, the processor 310 may analyze the captured image, via image processing means, and determine the delivery address that may be mentioned on the package 102b label. Thereafter, the processor 310 may compare the determined delivery address with a delivery vehicle current location (as identified from the navigation module 324) and check whether the determined address matches with the delivery vehicle current location. The processor 310 may determine that the user 110 has picked the correct package 102b (and hence delivering the correct package 102b) when the address and the vehicle current location match. In other aspects, the processor 310 may determine that the user 110 has picked an incorrect package when the address and the vehicle current location do not match. In both the cases (i.e., when the user 110 picks correct or incorrect package), the processor 310 may provide corresponding visual or audio notifications to the user 110.

In alternative aspects, the processor 310 may scan the package 102b QR code from afar when the user 110 picks the package 102b, and check whether the user 110 has picked the correct package. In this case, the processor 310 may fetch the package 102b destination location from the package attribute database 314 (based on the QR code scan) and compare the fetched location with the delivery vehicle current location. The processor 310 may determine that the user 110 has picked the correct package 102b when both the locations match, as described above.

In additional aspects, the processor 310 may use vehicle exterior cameras (e.g., B-pillar cameras, not shown), to confirm whether the user 110 has delivered the package 102b to the package 102b destination location. In this case, the processor 310 may transmit, via the transceiver 308, images or videos captured by the vehicle exterior cameras to the package 102b customer and/or the server 304, as proof of package 102b delivery. In some aspects, the processor 310 may livestream the captured images or videos to a customer's user device.

The processor 310 may update the inventory database 318 when the user 110 delivers the package 102b. In a similar manner, the processor 310 may assist the user 110 to deliver the plurality of packages 102 along the delivery route and may update the inventory database 318 as and when the user unloads/delivers a package.

Figure 5:
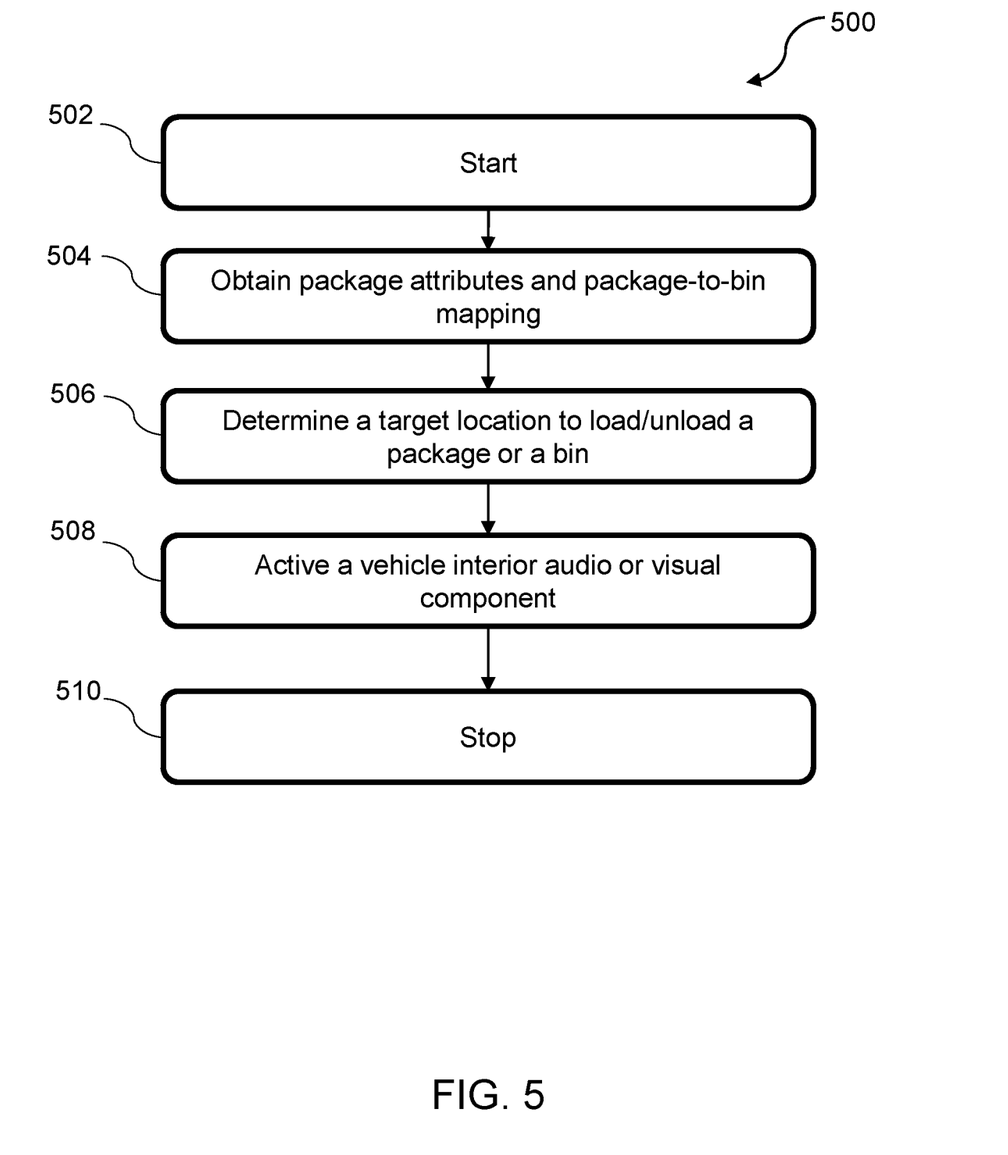
FIG. 5 depicts a flow diagram of an example method for loading and unloading a plurality of packages in a delivery vehicle, in accordance with the present disclosure.

FIG. 5 depicts a flow diagram of an example method 500 for loading and unloading the plurality of packages 102 in the delivery vehicle 302, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include obtaining, by the processor 310, package attributes and the package-to-bin mapping for each package 102. As described above, the processor 310 may obtain the package 102b attributes from the package attribute database 314 and the mapping of the package 102b with a bin (e.g., the bin 106c) from the mapping database 320, when the user 110 scans the package 102b QR code.

Responsive to determining the package 102b attributes and the package-to-bin mapping, the processor 310 may determine a target location in the delivery vehicle 302 where the package 102b or the bin 106c may be placed, at step 506. Specifically, the processor 310 may determine the target location in the base plate 104 where the user 110 may couple the bin 106c or place the package 102b, based on the package 102b attributes as described above.

At step 508, the method 500 may include activating, via the processor 310, the vehicle interior audio or visual component to assist/guide the user 110 to reach to the determined target location. The process of assisting the user 110 to reach to the target location is already described above in conjunction with FIG. 3.

The method 500 ends at step 510.

The method 500 may include additional steps that are not shown in FIG. 3. For example, as described above, the processor 310 may determine whether the user 110 has placed the package 102b in a correct bin by using vehicle interior cameras, and provide the confirmation notification to the user 110 when the user 110 correctly places the package 102b. Further, the processor 310 may assist the user 110 during package 102b unloading operation by determining whether the delivery vehicle 302 has reached the package 102b destination location during transit, and activating the vehicle interior audio or visual component to assist the user 110 to reach to the target location when the delivery vehicle 302 reaches the package 102b destination. The details of package loading/unloading are already explained in conjunction with FIG. 3, and not described here again for the sake of simplicity and conciseness.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A delivery vehicle comprising:
a holding mechanism configured to hold a plurality of containers within the delivery vehicle, wherein the plurality of containers is configured to store a plurality of packages, wherein the holding mechanism is a sliding base plate mounted on a sidewall of the delivery vehicle and the plurality of containers are configured to be removably attached to the sliding base plate;
at least one memory that stores computer-executable instructions, wherein the at least one memory further stores a first information comprising package attributes of each package and a mapping of each package with a container of the plurality of containers, and
at least one processor configured to access the at least one memory and execute the computer-executable instructions to at least:
obtain the first information from the at least one memory;
determine a target location to load a target package or a target container in the delivery vehicle based on the first information; and
activate a vehicle interior visual or audio component to indicate the target location in the delivery vehicle to load the target package or the target container.

2. The delivery vehicle of claim 1, wherein the package attributes comprise at least one of: a desired package temperature, a package destination location, a package delivery schedule, a package weight, package dimensions and package content information.

3. The delivery vehicle of claim 1 wherein the at least one processor is further configured to:
determine whether the delivery vehicle has reached a target package destination location; and
activate the vehicle interior visual or audio component to indicate the target location in the delivery vehicle to unload the target package when the delivery vehicle reaches the target package destination location.

4. The delivery vehicle of claim 3, wherein the at least one processor is further configured to:
activate a vehicle camera to capture a target package image in the target location; and
determine whether a user has picked the target package based on the target package image.

5. The delivery vehicle of claim 4, wherein the at least one processor is further configured to generate a first confirmation notification when the user picks the target package.

6. The delivery vehicle of claim 4, wherein the at least one processor is further configured to generate a second notification when the user does not pick the target package.

7. The delivery vehicle of claim 1, wherein the vehicle interior visual or audio component comprises a vehicle projector.

8. The delivery vehicle of claim 1, wherein the vehicle interior visual or audio component comprises a vehicle audio component.

9. The delivery vehicle of claim 1, wherein the vehicle interior visual or audio component comprises a vehicle lighting component.

10. The delivery vehicle of claim 1, wherein the vehicle interior visual or audio component comprises a vehicle display component.

11. The delivery vehicle of claim 1, wherein the holding mechanism is connected to a power supply to control temperature of at least one container.

12. A method for managing a plurality of packages in a delivery vehicle, the method comprising:
obtaining, by a processor, a first information from a vehicle memory,
wherein the first information comprises package attributes of each package and a mapping of each package with a container of a plurality of containers,
wherein each of the plurality of containers is configured to store one or more of the plurality of packages, and
wherein the delivery vehicle comprises a holding mechanism configured to removably hold the plurality of containers within the delivery vehicle, wherein the holding mechanism is a sliding base plate mounted on delivery vehicle sidewalls and the first information further comprises a mapping between each of the plurality of containers and a location on the sliding base plate;

determining, by the processor, a target location to load a target package or a target container in the delivery vehicle based on the first information; and activating, by the processor, a vehicle interior visual or audio component to indicate the target location in the delivery vehicle to load the target package or the target container.

13. The method of claim 12, wherein the package attributes comprise at least one of: a desired package temperature, a package destination location, a package delivery schedule, a package weight, package dimensions and package content information.

14. The method of claim 12 further comprising:

determining whether the delivery vehicle has reached a target package destination location; and activating the vehicle interior visual or audio component to indicate the target location in the delivery vehicle to unload the target package when the delivery vehicle reaches the target package destination location.

15. The method of claim 14 further comprising:

activating a vehicle camera to capture a target package image in the target location; and determining whether a user has picked the target package based on the target package image.

16. The method of claim 15 further comprising generating a first confirmation notification when the user picks the target package.

17. The method of claim 15 further comprising generating a second notification when the user does not pick the target package.

18. A non-transitory computer-readable storage medium in a distributed computing system, the non-transitory computer-readable storage medium having instructions stored thereupon which, when executed by a processor, cause the processor to:

obtain a first information from a vehicle memory of a delivery vehicle, wherein the first information comprises package attributes of each package of a plurality of packages and a mapping of each package with a container of a plurality of containers, wherein the plurality of containers is configured to store the plurality of packages, and wherein the delivery vehicle comprises a holding mechanism configured to hold the plurality of containers within the delivery vehicle, wherein the holding mechanism is a sliding base plate mounted on delivery vehicle sidewalls;

determine a target location to load a target package or a target container in the delivery vehicle based on the first information; and activate a vehicle interior visual or audio component to indicate the target location in the delivery vehicle to load the target package or the target container.

* * * * *